United States Patent [19]

Lewis

[11] 3,770,919

[45] Nov. 6, 1973

[54] MAGNETIC BUCKLE SWITCH
[75] Inventor: Donald J. Lewis, Troy, Mich.
[73] Assignee: Allied Chemical Corporation, New York, N.Y.
[22] Filed: Mar. 6, 1972
[21] Appl. No.: 232,042

[52] U.S. Cl. .......... 200/61.58 B, 335/205, 297/385, 180/82 C
[51] Int. Cl. ......................................... H01h 36/00
[58] Field of Search ................. 200/61.18, 61.58 B; 180/82 C; 280/150 SB; 297/388; 340/525 B; 307/10 SB; 335/205, 207

[56] References Cited
UNITED STATES PATENTS
3,612,791 10/1971 Porter et al. ..................... 200/61.18
3,154,167 10/1964 Butler et al. ............. 200/61.58 B X
3,147,819 9/1964 Keleher ................... 200/61.58 B X Primary Examiner—J. R. Scott
Attorney—Jonathan Plaut

[57] ABSTRACT

Switch in seat belt buckle which operates upon insertion of tongue of buckle and operates under magnetic force when tongue is not inserted in buckle to give signal indication or interlock with ignition.

6 Claims, 5 Drawing Figures

PATENTED NOV 6 1973 3,770,919

MAGNETIC BUCKLE SWITCH

This application relates to a magnetic buckle switch to be used in a seat belt buckle arrangement, for example for automotive or aircraft seat belt utilization. More particularly, this invention relates to the introduction in the buckle part of the seat belt arrangement of a magnetically sensitive switch which when closed when the seat is occupied will complete a circuit to give signal to the operator of the vehicle that the seat belts are not fastened, or further, in automotive vehicle utilization, will interrupt the ignition circuit of the automobile so as to not allow operation.

It has been proposed by various arrangements that when the seat belts of an automobile, for example, are not fastened in a location occupied by the driver or passenger that a signal, visual and/or audible, and/or an interlock to the ignition to prevent ignition, be provided for. Such provision either in a retractor winding up and storing said seat belt or in the seat belt buckle has previously been proposed, but such proposals are complicated and require significant modification to the seat belt and retractor structure.

This invention generally provides for the introduction into the seat belt buckle of a switch, for example in the preferred embodiment a split reed device, which closes under the influence of a magnet also found in the buckle. The tongue of the buckle is inserted between the magnet and the switch device, such that when the tongue is inserted it breaks or decreases the magnetic force of the magnet on the switch, which then opens. When the switch is opened, the circuit from the source of electric power, the battery for example, to driver awareness means, such as a warning buzzer, a warning light, and/or a solenoid for opening a switch in the ingition circuit, for example, is broken and no visual, audible or interlock with the ignition indication occurs, When the tongue is removed from the buckle, the influence of the magnet on the switch is such that the switch closes and such visual, audible or interlock with ignition indication as is programmed by the completed circuit of the closed switch takes place.

The simple circuit utilizing the switch within the buckle may be provided with a second switch device which is responsive to a switch within the seat of the passenger or occupant utilizing the particular seat belt, so that the visual and/or audible indication will only give the indication of being unbuckled when the occupant is sitting in the seat position utilizing it, and interlock with the ignition will only then so occur.

The invention will become clearer with reference to the following more detailed disclosure of which FIG. 1 is a schematic of a seat belt buckle assembly in which the tongue of the buckle has been inserted;

Figure 1:
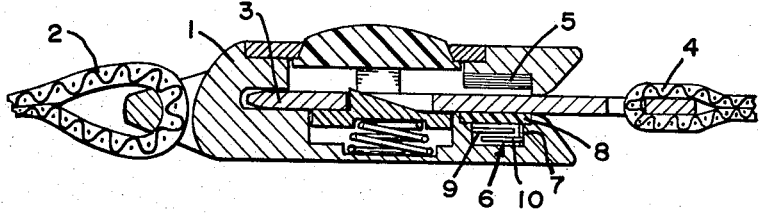

According to the invention, a seat belt buckle 1 is shown as attached to seat belt webbing 2. A tongue 3 is shown schematically locked within the seat belt buckle 1, said tongue being attached to the other length of seat belt webbing 4. Details of one embodiment of such a seat belt buckle may be found in U.S. Pat. No. 3,522,640, issued Aug. 4, 1970. Located for example at the edge of the buckle adjacent to where the tongue enters the buckle and on opposite sides of the tongue are a magnet 5 and a switch device 6, mounted within the buckle, for example on a pedestal 7. The switch 6 may be enclosed on the pedestal by a plastic shield 8, for example, for protection. The switch comprises in one illustrative embodiment, two flexible metal reeds 9 and 10. When the tongue 3 is within the buckle 1 as shown in FIG. 1, the magnetic field or force of the magnet 5 on the reeds 9 and 10 is insufficient to cause them to contact. When the tongue 3 is not located within the buckle 1, the magnetic field or force on the reeds 9 and 10 is sufficient to bring the reeds into contact with one another, closing the circuit to give indication or interlock with the ignition circuit as will be described hereinafter.

Thus when the seat belt is not fastened, the reed switch is closed and an indication of visual and/or audible signal, and/or interlock to the ignition circuit is made. Operation of the vehicle may only be made without such signal indication or after such interlock with the ignition circuit is removed by fastening the seat belt.

Figure 3:
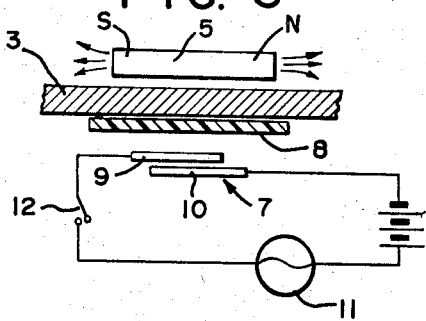
FIG. 3 is an illustrative circuit.

As shown in FIG. 3, the reed switch 7 with its fingers 9 and 10 is connected to a lamp for indicator 11 which is in turn connected to a battery or other source of electrical current to complete the circuit. The signalling device 11 may be a visual indicator and/or a buzzer, or other audible indicating means. Furthermore, the indicator 11 may be in the form of a circuit interruption or other device to open the ignition circuit or otherwise make ignition impossible, such as a solenoid, for example, which when the switch 7 is closed is energized by completion of the circuit to open a switch in the ignition circuit, not shown, so that ignition of the vehicle may not be undertaken until the switch 7 is open. Thus, the indicator 11 in the circuit diagram of FIG. 3 may be the visual, audible or interlock means for interconnection to the ignition circuit, or a combination of two or all three. Obviously, the solenoid-powered breaking of the ignition circuit is only one way in which to interlock the seat belt buckling with the ignition circuit.

As shown in FIG. 3, optionally included within the circuitry may be a switch 12 which closes to complete the circuit responsive to activation of a switch found within the seat on which the occupant or driver using the particular seat belt is sitting, so that the seat belt buckle switch will only have an effect on the visual and-/or audible indication or the ignition interlock if an occupant or the driver is in fact sitting in the position utilizing the seat belt.

A seat switch 13 of the type described in the preceding paragraph is shown within the seat 14 such that when an occupant sits in the seating position on the seat 14 to use the seat belt buckle 1 the weight of his body on the cushion 15 will depress and close the switch 13 against the force of spring contact 16 (against contact plate 17) and thus close the switch 12. Then, after sitting in position 15, if the occupant or passenger does not latch the seat belt 1 so that the tongue 2 interrupts the magnetic flux or force between the magnet 5 and the reed switch 7, the visual and/or audible indication, and/or ignition interlock will take place. When an occupant is not sitting on the seat 14 in the position 15 over the seat switch, the switch 12 will be open and the circuit shown in FIG. 3 will have no bearing on visual or audible indications or the starting of the ignition of the vehicle.

Figure 2:
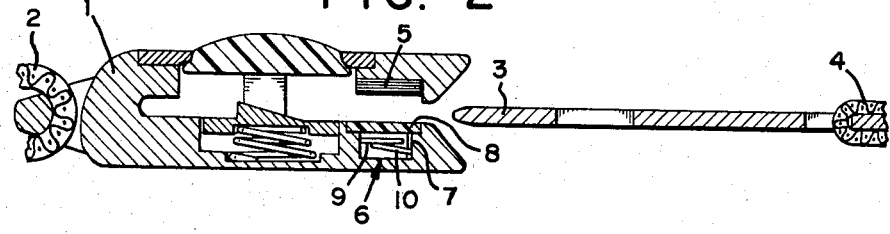
FIG. 2 is the schematic of FIG. 1 with the tongue removed.
Figure 2A:
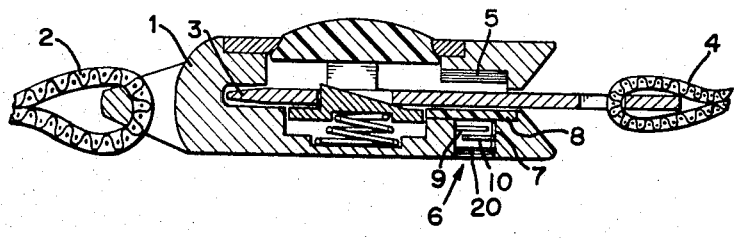
FIG. 2A is another embodiment.
Figure 4:
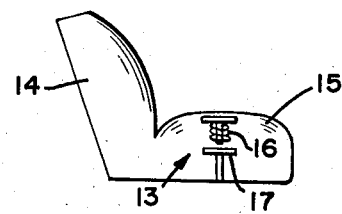
FIG. 4 is a simple weight switch which might be utilized in the embodiment disclosed.

The circuitry of FIG. 3, as well as the particular switch shown in FIG. 4 are illustrative of one operative embodiment of the invention, but not meant to limit the invention. The seat belt buckle of FIGS. 1 and 2 are shown in schematic form in order to illustrate the introduction of the tongue to break off the magnetic influence over the switch. The particular switch shown in FIGS. 1 and 2 is highly advantageous, as is the placement of the magnet and switch near the point of entry of the tongue, since they are removed from the structure which locks the tongue into the buckle. Of course, the arrangement may be reversed so that insertion of the buckle causes closing of the switch, as shown in FIG. 2A, as by, for example, inclusion of a second magnet 20 whose force on the switch is great enough to contact reeds 9 and 10 when the tongue 3 interrupts the force of the magnet 5. In such an embodiment, the opening of the switch 6 causes the signal to occur. The location of the switch and magnet near the webbing end of the buckle, as shown in FIG. 2A, for example, requires the switch to be operated on buckling.

It is meant that the invention only be limited to the scope of the following claims.

I claim:

1. A safety seat belt assembly in a vehicle with driver awareness means for indication to the driver that the safety seat belt has not been buckled, which comprises:
   a. a buckle connected to a first section of seat belt webbing, said webbing being attached to the vehicle;
   b. a tongue connected to a second section of seat belt webbing, said webbing being attached to the vehicle;
   c. an opening in said buckle into which said tongue is inserted;
   d. a latch bar in said buckle for engaging and locking the tongue when inserted in the opening of the buckle;
   e. a release button in said buckle for release of the latch bar to permit the tongue to be withdrawn from the buckle;
   f. switch means mounted in said buckle, said switch means having two operable positions; and
   g. magnet means comprising a magnet disposed in the buckle on the side opposite the switch with the tongue when inserted in the buckle interposed between the magnet and the switch, said switch means being in one operable position under the force of said magnet when the tongue is not inserted in said buckle and being in a second operable position when said tongue is interposed between the magnet and the switch.

2. Apparatus as claimed in claim 1, said switch designed to open under the force of the magnet means when the tongue is inserted.

3. Apparatus as claimed in claim 1, said switch designed to close under the force of the magnet means when the tongue is inserted.

4. Apparatus as claimed in claim 3, said magnet means comprising a magnet located on the opposite side of the buckle in relation to the tongue from said switch and a magnet on the same side of the buckle in relation to the tongue as said switch, said magnet on the opposite side of the buckle causing said switch to open under the magnetic force when the tongue is not inserted and said magnet on the same side of the buckle as the switch causing said switch to close when the tongue is inserted and the force of the first named magnet is therefore lessened.

5. Apparatus as claimed in claim 4, said switch means comprising two reeds spaced apart.

6. Apparatus as claimed in claim 5, said magnet means and reeds located adjacent to the webbing end of the buckle thereby requiring operation of the switch means as the tongue is engaged.

* * * * *